Figure 1:
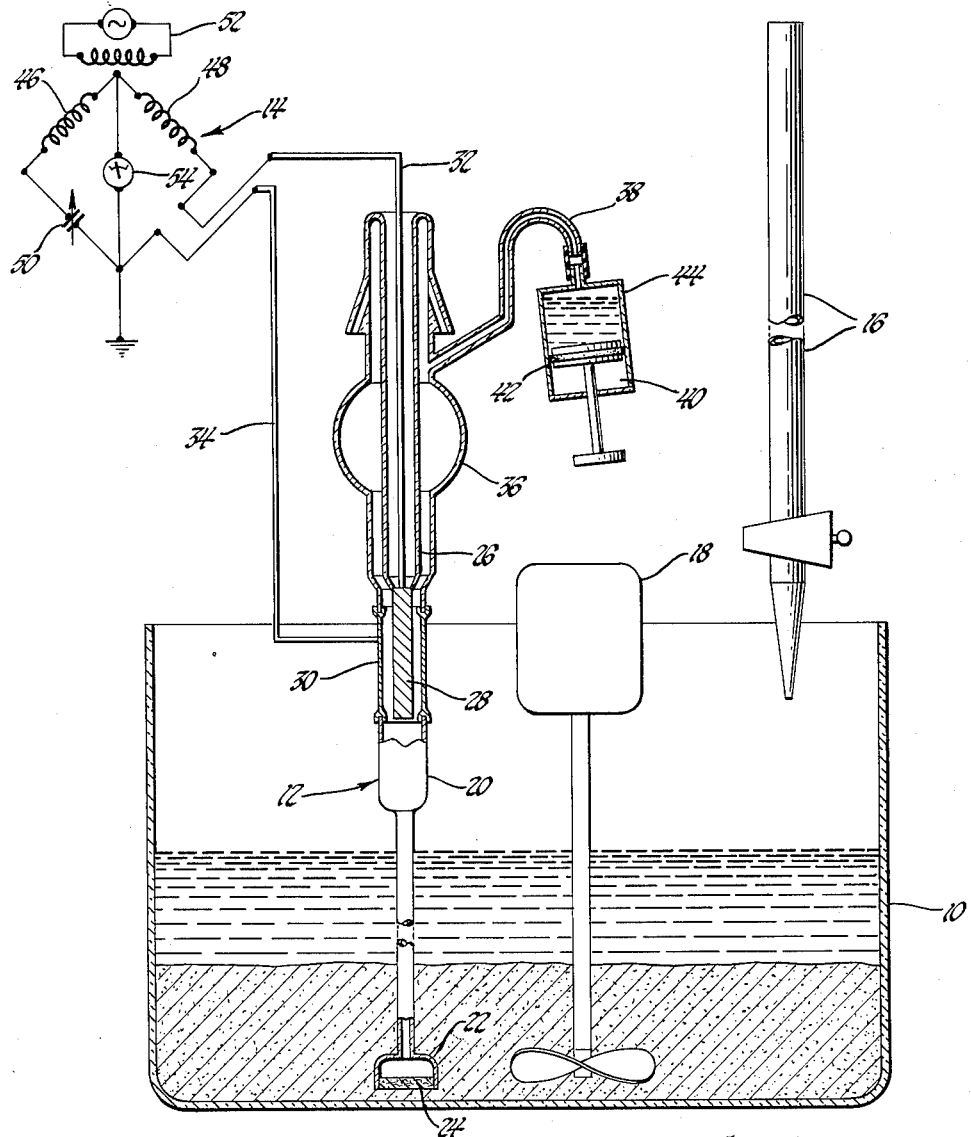

May 31, 1966 S. KATZ ETAL 3,253,458

METHOD AND APPARATUS FOR MEASURING MOISTURE

Filed Dec. 9, 1963

INVENTORS
Richard R. Ferrero,
BY & Seymour Katz
Hugh L. Fisher
ATTORNEY

United States Patent Office 3,253,458
Patented May 31, 1966

3,253,458
METHOD AND APPARATUS FOR MEASURING MOISTURE
Seymour Katz, Oak Park, and Richard R. Ferrero, Dearborn, Mich., assignors to General Motors Corporation, Detroit, Mich., a corporation of Delaware
Filed Dec. 9, 1963, Ser. No. 328,903
11 Claims. (Cl. 73—73)

This invention relates to improved method and apparatus for measuring the moisture content of different materials.

Considering foundry sand as exemplary of the material whose moisture content must be carefully controlled, it is customary to use apparatus comprising a pair of electrodes between which a specimen of the sand is placed. This forms a capacitor whose capacitance reflects the amount of moisture in the specimen. Since the sand itself has a relatively low dielectric constant and the water a very high dielectric constant, small changes in the moisture content of the sand will have a substantial influence on its dielectric constant. Therefore, capacitive variations accurately reflect changes in moisture content. As a practical matter, this method is not entirely satisfactory because of packing and the resultant errors due to variations in the sand density as well as size discrepancies between different sand containers, all of which influence the capacitance. To overcome these problems various proposals have been made, but they usually involve a container design that is supposed to prevent the material from packing while its capacitance is measured.

It is now proposed to overcome this problem by a new and different method in which a substance is used to extract moisture from a specimen of material and then an electrical characteristic of a solution formed from the substance and the water extracted from the material is measured. Variations in the electrical characteristic reflect the moisture content of the material. More specifically, the method contemplates measuring the dielectric constant of a solution comprising a moisture extracting liquid and the water extracted from the material by the liquid so as to ascertain any change in the amount of water in the solution and accordingly the moisture content of the material.

The invention also contemplates apparatus for measuring the dielectric constant of a solution formed from a moisture extracting substance and the moisture extracted from a material specimen, the novel apparatus being particularly suited for efficiently measuring the dielectric constant of the solution by, in effect, comparing the dielectric constant with a known reference. Moreover, the invention contemplates measuring apparatus that does not require accurate sizing of containers, that is self-cleaning in operation, that can be repeatedly used without having to dry the apparatus between tests, and that permits reproducible results to be made.

Figure 2:
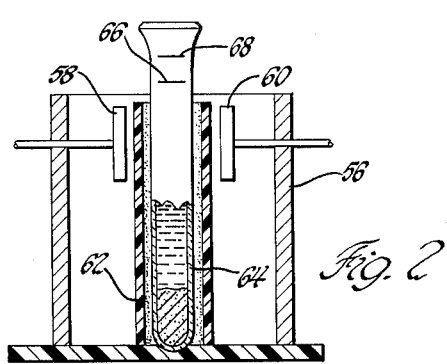

The foregoing and other objects and advantages of the invention will be apparent from the following description and the accompanying drawings, in which:

FIGURE 1 is a schematic diagram of apparatus incorporating the principles of the invention; and FIGURE 2 is a schematic diagram of a modified apparatus.

Considering now the drawings in detail, the numeral 10 denotes a container for the material whose moisture content is to be measured. The numeral 12 designates a measuring cell and the numeral 14 an electrical measuring circuit. In a way to be explained, the solution in the container 10, comprising both a moisture extracting substance and the water extracted from the material, is transferred to the measuring cell 12 where its dielectric constant is determined by the measuring circuit 14.

The specimen of the material in the container 10 may, for exemplary purposes only, be foundry sand. The amount of the specimen is measured and may, for instance, be 50 grams. To this 50-gram specimen of sand a moisture extracting substance, such as dioxane, methyl acetate, ethyl acetate, or alcohol, e.g., ethyl alcohol, propyl alcohol and butyl alcohol, is added in a measured amount by a burette 16. The main considerations in the selection of a moisture extracting substance is that it should be a liquid, have a relatively low dielectric constant and permit reproducible results to be obtained, i.e., it can be relied upon to extract the same amount of moisture and subsequently to mix with the water to the same degree during substantially identical tests. Dioxane was found to be very satisfactory because of its low dielectric constant (2.1). Moreover, dioxane is completely miscible with water and only 40 milliliters are required to absorb substantially all of the moisture in the foundry sand specimens.

To facilitate the extraction of the moisture from the sand specimen, a stirring motor 18 is used to agitate the sand for approximately one minute. This will produce a solution comprising the extracting liquid and the water absorbed from the sand specimen. The moisture content of the solution can now be ascertained in the measuring cell 12.

It is also mentioned that the extracting liquid used must not be of a character that becomes saturated with water prior to absorbing a reproducible amount of water. Otherwise, the test results become unreliable, particularly when the moisture contents are high.

The measuring cell 12, as noted in FIGURE 1, includes a stepped diameter glass tube 20 having an inlet at 22. Inlet 22 includes a filter 24 formed of some known and efficient filtering material, such as glass wool and fritted glass. Even a conventional pipe cleaner has been found to be satisfactory. Upstream from the inlet 22 the tube 20 has a depending internal glass portion 26 to which is attached an electrode 28 of any suitable conductive material that has approximately the same expansion and contraction qualities as glass and that permits a fluid tight seal to be made with the glass of the tube 20. By way of suggestion, an alloy of 54% Fe, 28% Ni and 18% Co meets these requirements and is commercially available under the name Kovar. Concentric with this electrode 28 is a hollow tubular-type electrode 30 of the same material as the electrode 28. Conductors 32 and 34 are connected respectively to the electrodes 28 and 30.

The glass tube 20 has a bulb-shaped storage 36 above the electrodes 28 and 30. The storage has an outlet passage 38 communicating with a pump or similar mechanism 40 for drawing fluid from the container 10 into the storage 36. The mechanism 40 in this instance is merely a piston-type motor having a piston 42 that is manually maneuverable back and forth within a cylinder 44. In operation, as the piston 42 is moved downwardly to the FIGURE 1 position, a decreased pressure will be produced in the storage 36 relative to the pressure of the fluid in the container 10; hence, the fluid within the container 10 will flow into the storage 36.

The electrical measurement circuit 14 may be in the form of a bridge circuit having inductances 46 and 48 in two of the legs and an adjustable capacitor 50 and the electrodes 28 and 30, connected thereto via the conductors 32 and 34, in the other two legs. The inductances 46 and 48 are transformer coupled to an oscillator circuit 52, which may have an output of 75 kilocycles. This output frequency can, of course, be varied as needed.

Connected across the output of the circuit 14 is an ammeter 54. Prior to a measurement and with a specimen of the moisture extracting liquid between the electrodes 28 and 30, the capacitor 50 can be adjusted until the circuit is tuned, at which time current flow through the ammeter 54 will be maximum. It is preferable that the circuit 14 be returned each time a different lot of the extracting liquid is used because the amount of impurities in the substance may vary from lot to lot.

With the circuit tuned and with a solution of the extracting liquid and the water from the sand specimen in the container 10, the mechanism 40 can be operated to draw the solution into the storage 36. Enough of the solution is drawn into the glass tube 20 so that the area between the electrodes 28 and 30 is completely filled. Any water present in the solution changes the dielectric constant of the area between the electrodes 28 and 30 and, therefore, the capacitance. A change in the capacitance detunes the circuit 14, causing less current to flow through the ammeter 54.

If wanted, the ammeter 54 can have its dial calibrated to read moisture content directly. This can, of course, be done in different ways; for instance, by checking the readings of a sufficient number of solutions with different known percentages of water to provide a complete dial scale. It should be noted that the dielectric constants of the solutions will have an empirical relationship to the percentages of water.

The circuit 14 can also be retuned with the solution in the glass tube 20 by readjusting the capacitor 50. The amount of this readjustment will reflect a movement that can be used to calculate the water content or through any conventional mechanism used to indicate on a dial the angular movement. The dial then can be calibrated by checking known specimens to read moisture content directly.

Whatever method is used to calibrate the dials for direct readings, each should be developed with consideration for the characteristics of the moisture extracting liquid. If the liquid is of the type that does not remove all of the moisture from a specimen the dials should reflect this. Again it is mentioned that the liquid must meet the reproducible results requirement. In other words, the amount of moisture the liquid will absorb under varying conditions must always be predictable.

When the measurement has been completed, the solution can be ejected from the tube 20 via inlet 22 merely by moving the piston 42 of the mechanism 40 upwardly from its illustrated position in FIGURE 1. The resultant increase in pressure in the outlet 38 will urge all of the solution from the glass tube 20. The cell 12 is now prepared to make another test which is conducted in the same manner; i.e., a new 50-gram specimen of sand is placed in the container 10 and another 40 milliliters of dioxane added by the burette 16. The stirring motor 18 is turned on for one minute, after which the solution is drawn into the storage 36 by the mechanism 40.

It should be noted that any particles of the solution remaining in the vicinity of the electrodes 28 and 30 are carried into the storage 36 by the new solution, thus providing a washing action that insures against the possibility that any contaminated solution, such as that from a previous test, remains between the electrodes 28 and 30. This self-cleaning action eliminates the need to carefully dry and clean the interior of the tube 20. Then too, the combination of the washing action and the filtering by the filter 22 facilitates the cleansing of the electrodes 28 and 30 so that they do not become covered with sediment.

The modified apparatus of FIGURE 2 includes a support 56 of some suitable plastic material such as Lucite. The support 56 has two plate-like electrodes 58 and 60 mounted thereon at a certain spaced distance. Between these two electrodes 58 and 60 the support 56 has mounted thereon a tubular housing 62 of any appropriate non-metallic material. The purpose of the housing 62 is to hold a test tube 64. The test tube 64 is filled to a level 66 with a moisture extracting substance, which can also be dioxane. Next, the specimen of the sand or whatever material is to be checked is added to the test tube 64 until the resultant mixture assumes the level at 68. The test tube 64 is then vigorously stirred or shaken. The electrical measuring circuit 14 can now be used in the same way as with the FIGURE 1 apparatus to check the dielectric constant of the solution between the electrodes 58 and 60.

Care must be taken that the solution comprising the extracting liquid and the water is between the electrodes 58 and 60, i.e., the electrodes 58 and 60 must be elevated high enough to be uninfluenced by the sand itself, which will settle to the bottom of the test tube 64. Another concern is that unless each test tube 64 has the same electrical characteristics as to size, glass thickness, etc., and always is placed in the same position relative to the electrodes 58 and 60, the circuit 14 will have to be recalibrated each time by retuning it with a test tube filled to the level 66 and in the proper position.

From the foregoing it will be appreciated that the density of the specimen material, i.e., whether it is compacted or loose, has no influence upon the measurement with the new novel method and apparatus thus eliminating a very serious problem. Moreover, the apparatus is very efficient in operation enabling a measurement to be taken quickly and accurately without resort to complexity.

The invention is to be limited only by the following claims.

What is claimed is:

1. The method of measuring the moisture content of material comprising the steps of combining a specimen of the material in a container with a moisture extracting liquid material, pumping a solution formed from the liquid and the moisture removed from the material directly from the container into a measuring chamber, and measuring the dielectric constant of the solution so as to determine the amount of moisture in the solution and accordingly the moisture content of the material.

2. The method of measuring the moisture content of material comprising the steps of adding a certain amount of a moisture extracting liquid to a measured specimen of the material, agitating the substance and the material to facilitate the extraction of the moisture from the material, and measuring variations in the dielectric constant of a solution formed from the liquid and the moisture removed from the material relative to a certain reference so as to determine the moisture content of the material.

3. The method of measuring the moisture content of material comprising the steps of adding a certain amount of a moisture extracting liquid to a container having a measured specimen of the material, pumping a sample of the solution of the liquid and the moisture extracted from the material directly from the container to an area between the electrodes of a capacitive measuring circuit, and measuring the dielectric constant of the solution so as to compare the amount of moisture in the solution with a predetermined reference and thereby ascertaining the moisture content of the material.

4. A method of measuring the moisture content of material comprising the steps of adding a certain amount of a homogenous water absorbing liquid to a measured specimen of the material, agitating the liquid and the material to facilitate the absorption of the moisture from the material, transferring a solution of the liquid and the moisture extracted from the material to an area between concentric electrodes, and connecting the electrodes to a measuring circuit so as to determine the variations in the dielectric constant of the solution from a predetermined reference and accordingly the amount of moisture in the material.

5. The method of measuring the moisture content of material comprising the steps of filling a container to a certain level with a moisture extracting liquid, adding a specimen of the material to the container until the material and the liquid attain another certain level, and measuring the dielectric constant of a solution formed from the liquid and the moisture removed from the material so as to ascertain the amount of moisture in this solution and accordingly the moisture content of the material.

6. The method of measuring the moisture content of material comprising the steps of filling a container to a certain level with a moisture extracting liquid, adding a specimen of the material to the container until the liquid and the material attain another certain level within the container, agitating the liquid and the material, placing the container in a capacitive measuring circuit, and measuring the dielectric constant of the solution formed from the liquid and the moisture extracted from the material so as to ascertain the amount of water in the solution and thereby enable the moisture content of the material to be determined.

7. The method of measuring the moisture content of granular material comprising the steps of filling a container to a certain level with a homogenous water absorbing liquid, adding a specimen of the material to the container until the material and the liquid attain another certain level, agitating the liquid and the material, installing the container between spaced electrodes so that a solution of the water and the liquid is between the electrodes and measuring the dielectric constant of the solution so as to determine changes in the dielectric constant relative to a reference thereby permitting the amount of moisture added to the liquid to be ascertained and accordingly the moisture content of the specimen of the material.

8. Apparatus for measuring the moisture content of a material specimen from which the moisture is to be extracted by a moisture extracting liquid to provide a solution of the water and the moisture extracting liquid comprising a container for the specimen and the moisture extracting liquid, means communicating with the container for agitating the specimen so as to facilitate extraction of the moisture therefrom, a measuring cell having an inlet communicating with the container, a storage, a filter in the inlet, and a pair of concentric electrodes stationed between the inlet and the storage, pump means communicating with the inlet for transferring samples of the solution from the container to the storage so that uncontaminated solution is also between the electrodes, circuit means communicating with the electrodes for measuring the dielectric constant of the solution so as to determine variations therein relative to a certain reference thereby enabling the amount of moisture in the solution to be ascertained and accordingly the moisture content of the specimen material.

9. Apparatus for measuring the moisture content of a granular material specimen from which the moisture is to be extracted by a homogenous water absorbing liquid to provide a solution of the water and the water absorbing liquid comprising a container for the specimen and the homogenous water absorbing liquid, means communicating with the container for agitating the specimen so as to facilitate the extraction of all the moisture therefrom, a measuring cell having an inlet passage situated in the container, a storage, a filter in the inlet, a pair of concentric electrodes positioned between the inlet and the storage, pump means communicating with the inlet for transferring samples of the solution from the container into the storage so as to completely immerse the electrodes, circuit means for measuring the dielectric constant of the solution between the electrodes, the circuit means including the electrodes and being tuned to resonance with a certain dielectric constant so that the solution will cause the circuit means to be detuned to an extent that corresponds to the amount of water in the solution thereby enabling the moisture content of the specimen material to be ascertained.

10. Apparatus for measuring the moisture content of a material specimen from which the moisture is to be extracted by a moisture extracting liquid to provide a solution of the water and the moisture extracting liquid comprising a container for the specimen and the moisture extracting liquid, a measuring cell having an inlet communicating with the container, a storage, and a pair of concentric electrodes stationed between the inlet and the storage, pump means communicating with the inlet for transferring samples of the solution from the container to the storage so that uncontaminated solution is also between the electrodes, circuit means communicating with the electrodes for measuring the dielectric constant of the solution so as to determine variations therein relative to a certain reference thereby enabling the amount of moisture in the solution to be ascertained and accordingly the moisture content of the specimen material.

11. Apparatus for measuring the moisture content of a material specimen from which the moisture is to be extracted by a moisture extracting liquid to provide a solution of the water and the moisture extracting liquid comprising a container for the specimen and the moisture extracting liquid, means communicating with the container for agitating the specimen so as to facilitate extraction of the moisture therefrom, a measuring cell having an inlet communicating with the container, a storage, and a pair of concentric electrodes stationed between the inlet and the storage, pump means communicating with the inlet for transferring samples of the solution from the container to the storage so that uncontaminated solution is also between the electrodes, circuit means communicating with the electrodes for measuring the dielectric constant of the solution so as to determine variations therein relative to a certain reference thereby enabling the amount of moisture in the solution to be ascertained and accordingly the moisture content of the specimen material.

References Cited by the Examiner

UNITED STATES PATENTS 2,767,574  10/1956  Schurch _____ 73—53
3,146,617   9/1964  Klein et al. _____ 73—73

LOUIS R. PRINCE, *Primary Examiner.*

DAVID SCHONBERG, *Examiner.*

M. B. HEPPS, *Assistant Examiner.*